United States Patent
Sohn et al.

(10) Patent No.: US 11,282,003 B2
(45) Date of Patent: *Mar. 22, 2022

(54) VALIDITY DETERMINATION OF AN EVENT TICKET AND AUTOMATIC POPULATION OF ADMISSION INFORMATION

(71) Applicant: StubHub, Inc., San Francisco, CA (US)

(72) Inventors: Eun Nok Sohn, San Francisco, CA (US); Venmal Arasu, San Francisco, CA (US)

(73) Assignee: StubHub, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/037,158

(22) Filed: Sep. 29, 2020

(65) Prior Publication Data

US 2021/0012251 A1 Jan. 14, 2021

Related U.S. Application Data (63) Continuation of application No. 14/586,794, filed on Dec. 30, 2014, now Pat. No. 10,789,554.

(Continued)

(51) Int. Cl.
*G06Q 10/02* (2012.01)
*G06Q 30/06* (2012.01)

(52) U.S. Cl.
CPC ............. *G06Q 10/02* (2013.01); *G06Q 30/06* (2013.01)

(58) Field of Classification Search
CPC ........................................ G06Q 10/02–10/025
See application file for complete search history.

(56) References Cited

U.S. PATENT DOCUMENTS

| 3,622,995 A | 11/1971 | Dilks et al. |
| 6,357,658 B1 | 3/2002 | Garczynski et al. |

(Continued)

FOREIGN PATENT DOCUMENTS

| CA | 2651543 C | 2/2008 |
| IN | 297175 A1 | 7/2009 |
| KR | 20140025928 A | 3/2014 |

OTHER PUBLICATIONS

Siu, et al., Extending E-Ticketing Service with Mobile Transactions, ICITA, 2002, pp. 1-5 (Year: 2002).*

(Continued)

*Primary Examiner* — Daniel Vetter
(74) *Attorney, Agent, or Firm* — McDermott Will & Emery LLP (57) ABSTRACT

There are provided systems and method for validity determination of an event ticket and automatic population of admission information. A user wishing to sell a ticket for admission to an event at a venue may upload an image containing a visual representation of the image. Ticket information may be extracted from the visual representation. The ticket information may be extracted using optical character recognition and/or polygon coordinates of information with assistance from template for the tickets. Additionally, using the ticket information or the visual representation of the ticket, ticket validity may be determined. The ticket validity may depend on the information presented on the ticket, the placement of the information on the ticket, or other factors, such as a database including sold and available tickets at the venue through validating with a Primary Partner. If the ticket is suspicious, the ticket may be reviewed or sale of the ticket prohibited.

20 Claims, 5 Drawing Sheets

Related U.S. Application Data (60) Provisional application No. 61/925,069, filed on Jan. 8, 2014.

(56) References Cited

U.S. PATENT DOCUMENTS

| | | | |
|---|---|---|---|
| 6,701,335 | B2 | 3/2004 | Pupalaikis |
| 6,701,355 | B1 | 3/2004 | Brandt et al. |
| 6,959,286 | B2 | 10/2005 | Perkowski |
| 7,246,116 | B2 | 7/2007 | Barsness et al. |
| 8,175,926 | B1 | 5/2012 | Handel et al. |
| 8,190,586 | B2 | 5/2012 | Knuetter et al. |
| 8,585,224 | B2 | 11/2013 | Ehm et al. |
| 8,947,714 | B2 | 2/2015 | Ishihara et al. |
| 9,032,045 | B1 | 5/2015 | Leblang |
| 9,372,681 | B1 | 6/2016 | Shevchenko et al. |
| 9,563,414 | B2 | 2/2017 | Berg et al. |
| 9,594,956 | B2 | 3/2017 | Cohen et al. |
| 10,057,251 | B2 | 8/2018 | Strand et al. |
| 10,304,060 | B2 | 5/2019 | Ilagan |
| 10,304,110 | B2 | 5/2019 | Athimoolam |
| 10,789,554 | B2 | 9/2020 | Sohn et al. |
| 2001/0018660 | A1 | 8/2001 | Sehr |
| 2001/0030234 | A1 | 10/2001 | Wiklof |
| 2002/0007322 | A1 | 1/2002 | Stromberg |
| 2002/0116343 | A1 | 8/2002 | Nakamura et al. |
| 2002/0143618 | A1 | 10/2002 | Kenner et al. |
| 2002/0165931 | A1 | 11/2002 | Greer et al. |
| 2002/0174003 | A1 | 11/2002 | Redmann et al. |
| 2003/0097419 | A1 | 5/2003 | Pradhan et al. |
| 2003/0105641 | A1 | 6/2003 | Lewis |
| 2003/0120543 | A1 | 6/2003 | Carey |
| 2005/0197894 | A1 | 9/2005 | Fairbanks et al. |
| 2006/0081710 | A1 | 4/2006 | Streeter |
| 2006/0123338 | A1 | 6/2006 | McCaffrey et al. |
| 2006/0151592 | A1 | 7/2006 | Poor |
| 2007/0124259 | A1 | 5/2007 | Sussman et al. |
| 2007/0208751 | A1 | 9/2007 | Cowan et al. |
| 2007/0276944 | A1 | 11/2007 | Samovar et al. |
| 2008/0005017 | A1 | 1/2008 | Poster |
| 2008/0204282 | A1 | 8/2008 | Jeon |
| 2009/0013244 | A1 | 1/2009 | Cudich et al. |
| 2009/0063206 | A1 | 3/2009 | Payne et al. |
| 2009/0063667 | A1 | 3/2009 | Smith et al. |
| 2009/0164635 | A1 | 6/2009 | Denker et al. |
| 2009/0209240 | A1 | 8/2009 | Mahowald |
| 2010/0082374 | A1 | 4/2010 | Charania et al. |
| 2010/0082491 | A1 | 4/2010 | Rosenblatt et al. |
| 2010/0113072 | A1 | 5/2010 | Gibson et al. |
| 2010/0131366 | A1 | 5/2010 | Gibson et al. |
| 2010/0131530 | A1 | 5/2010 | Gibson et al. |
| 2010/0205053 | A1 | 8/2010 | Shuster |
| 2010/0228576 | A1 | 9/2010 | Marti et al. |
| 2010/0232700 | A1 | 9/2010 | Kashibuchi et al. |
| 2010/0268649 | A1 | 10/2010 | Roos et al. |
| 2011/0119732 | A1 | 5/2011 | Dunn |
| 2011/0147448 | A1 | 6/2011 | Johnson |
| 2011/0288932 | A1 | 11/2011 | Marks et al. |
| 2012/0029997 | A1 | 2/2012 | Khan et al. |
| 2012/0078667 | A1 | 3/2012 | Denker et al. |
| 2012/0084292 | A1 | 4/2012 | Liang et al. |
| 2012/0323898 | A1 | 12/2012 | Kumar et al. |
| 2013/0031080 | A1 | 1/2013 | Vijaywargi et al. |
| 2013/0060744 | A1 | 3/2013 | Roychoudhuri et al. |
| 2013/0124234 | A1 | 5/2013 | Nilsson et al. |
| 2013/0132136 | A1 | 5/2013 | Sunshine et al. |
| 2013/0173367 | A1 | 7/2013 | Beighley, Jr. |
| 2013/0191172 | A1 | 7/2013 | Tacchi et al. |
| 2013/0268899 | A1 | 10/2013 | Valentino |
| 2014/0075428 | A1 | 3/2014 | van Elsas et al. |
| 2014/0095226 | A1 | 4/2014 | Kourkoumelis et al. |
| 2014/0095333 | A1 | 4/2014 | Zises |
| 2014/0100896 | A1 | 4/2014 | Du et al. |
| 2014/0101289 | A1 | 4/2014 | Antonov et al. |
| 2014/0129733 | A1 | 5/2014 | Klais |
| 2014/0280275 | A1 | 9/2014 | Copsey |
| 2014/0280995 | A1 | 9/2014 | Ezell |
| 2015/0012307 | A1 | 1/2015 | Moss |
| 2015/0186973 | A1 | 7/2015 | Athimoolam |
| 2015/0193701 | A1 | 7/2015 | Sohn et al. |
| 2015/0233715 | A1 | 8/2015 | Xu et al. |
| 2016/0044203 | A1 | 2/2016 | Paul et al. |
| 2016/0131487 | A1 | 5/2016 | Xu et al. |
| 2016/0180602 | A1 | 6/2016 | Fuchs |
| 2016/0189272 | A1 | 6/2016 | Albanese |
| 2016/0321568 | A1 | 11/2016 | Gosuin |
| 2016/0371610 | A1 | 12/2016 | Bronner |
| 2017/0026709 | A1 | 1/2017 | Tilaye et al. |
| 2018/0165882 | A1 | 6/2018 | Choi et al. |
| 2019/0069045 | A1 | 2/2019 | Kahn |
| 2019/0340667 | A1 | 11/2019 | Athimoolam |

OTHER PUBLICATIONS

Rascher, et al., The Antitrust Implications of "Paperless Ticketing" on Secondary Markets, Journal of Competition Law & Economics, vol. 9, No. 3, Sep. 2013, pp. 655-708 (Year: 2013).*

International Search Report and Written Opinion, as issued in connection with International Patent Application No. PCT/US2019/054854, dated Feb. 12, 2020, 10 pgs.

U.S. Office Action in U.S. Appl. No. 16/177,266, dated Aug. 19, 2019, 17 pgs.

U.S. Office Action in U.S. Appl. No. 16/177,266, dated Feb. 19, 2020, 18 pgs.

U.S. Office Action in U.S. Appl. No. 16/177,266, dated Jun. 25, 2020, 20 pgs.

U.S. Office Action in U.S. Appl. No. 16/177,266, dated Oct. 6, 2020, 20 pgs.

U.S. Office Action in U.S. Appl. No. 16/383,064, dated Nov. 18, 2020, 6 pgs.

Smith, How to Scam Big Money From Sports & Music Fans Everywhere!, Islamorada Investment Management, Nov. 13, 2013, available at https://www.islainvest.com/report/special-report-how-to-scam-big-money.pdf, 32 pgs.

Talalay, Heat firm sues ticket resellers, Miami Sun Sentinel, Jan. 16, 2008, 3 pgs.

* cited by examiner

VALIDITY DETERMINATION OF AN EVENT TICKET AND AUTOMATIC POPULATION OF ADMISSION INFORMATION

CROSS-REFERENCE TO RELATED APPLICATIONS

This application is a continuation of U.S. patent application Ser. No. 14/586,794, filed on Dec. 30, 2014, now U.S. Pat. No. 10,789,554, issued on Sep. 29, 2020; which claims the benefit of U.S. Patent Application Ser. No. 61/925,069, filed on Jan. 8, 2014; the disclosures of which are incorporated herein by reference in their entireties.

TECHNICAL FIELD

The present application generally relates to validity determination of an event ticket and automatic population of admission information and more specifically to receiving a visual representation of an event admission ticket and performing a validity determination and ticket information extraction using the visual representation.

BACKGROUND

Users may utilize online marketplaces to purchase and sell items. Certain online marketplaces may offer ticket sale and resale services to both ticket vendors (e.g., venues and large multi-venue ticket sellers) and consumers who wish to resell purchased tickets. However, when selling tickets, the marketplace may receive ticket information and attempt to verify the correctness of the information as well as the authenticity of the ticket. Additionally, certain sellers may try to sell a ticket twice or more, whether accidentally or maliciously, which may result in multiple sales and resources spent on correcting the resulting issues. Additionally, incorrect ticket information may result in a purchaser of a ticket requesting a refund for the sale if the ticket doesn't meet the purchaser's requirements.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

Provided are methods that provide for validity determination of an event ticket and automatic population of admission information. Systems suitable for practicing methods of the present disclosure are also provided.

An online ticket marketplace may offer ticket sales services to users. Such ticket sales services may include sales through uploaded ticket images. In order to upload ticket information, verify ticket validity, and create a sale offer, the users may upload a visual representation of an event admission ticket to a venue to a server for the marketplace. The visual representation may correspond to a captured image of a ticket, such as through a camera module of a communication device. Thus, the captured image may correspond to an image file. However, the visual representation may also correspond to a scanned image and file, and may include more than one event admission ticket. For example, the visual representation may include a set of tickets that the user wishes to sell. When receiving the file, the server may determine if the file is valid and may perform some basic processing to determine whether the file has a legible visual representation of the event admission ticket. For example, lighting, contrast, and/or clarity may make the visual representation in the file unreadable to the server. Where the visual representation is not readable, the server may request a new visual representation from the user.

A server for the online ticket marketplace may determine ticket information and ticket validity. The server may execute a ticket processing module comprising specialized hardware and/or software to perform optical character recognition of information present in the visual representation. Thus, characters may be recognized within the visual representation in order to pull the ticket data from the visual representation. The server may also or instead use the polygon coordinates of the ticket information on the visual representation of the event admission ticket. For example, the server may include a database having ticket templates. The ticket templates may include coordinates/data for where ticket information should be displayed on the ticket or be processed to determine such information. The ticket templates may include information such as polygon coordinates for seat, row, section, etc. numbers, where a bar/QR code is placed for admission using a scanner, or where other information such as a ticket identification number is located. Using the ticket template, the marketplace server may extract ticket information from the visual representation of the ticket.

The ticket information may be used to determine the ticket validity. For example, the ticket information may include a ticket identification number or bar/QR code that may be used to determine if the ticket has been previously sold, or is posted in another sale offer. The ticket information may also be used with information in a database to determine if the ticket is valid by determining whether the seat or admission has been previously sold or whether the seat, row, and/or section number is valid for the venue (e.g., using a ticket seating map and/or available tickets). Thus, the server may determine the ticket validity by processing the ticket information with known ticket sales, ticket information for the venue, and/or available ticket information to determine the ticket validity.

If the visual representation of the event admission ticket does not have a matching template in a database of the server, the server may create a new template using submitted ticket information from the user. Thus, the server may request the user to enter ticket information for the event ticket information or may process the visual representation by extracting ticket information using optical character recognition and requesting either the user or a ticket sale administrator to review the ticket information. Once the ticket information for the ticket without a template is determined, the user or the ticket sale administrator may utilize the submitted ticket information to generate a new ticket template for the submitted visual representation.

Once the ticket information is extracted and the ticket validity determined, the server may process the information to create a sale offer for the event admission ticket. The sale offer may require additional ticket verification or an assurance from the seller if the ticket validity is questionable or cannot be determined. Additionally, the sale offer may include sale/resale terms, delivery of the ticket including electronic delivery, or other information. If the ticket has been previously sold, the user may be required to provide additional assurances that the user possesses the event admission ticket prior to posting the sale offer.

Figure 1:
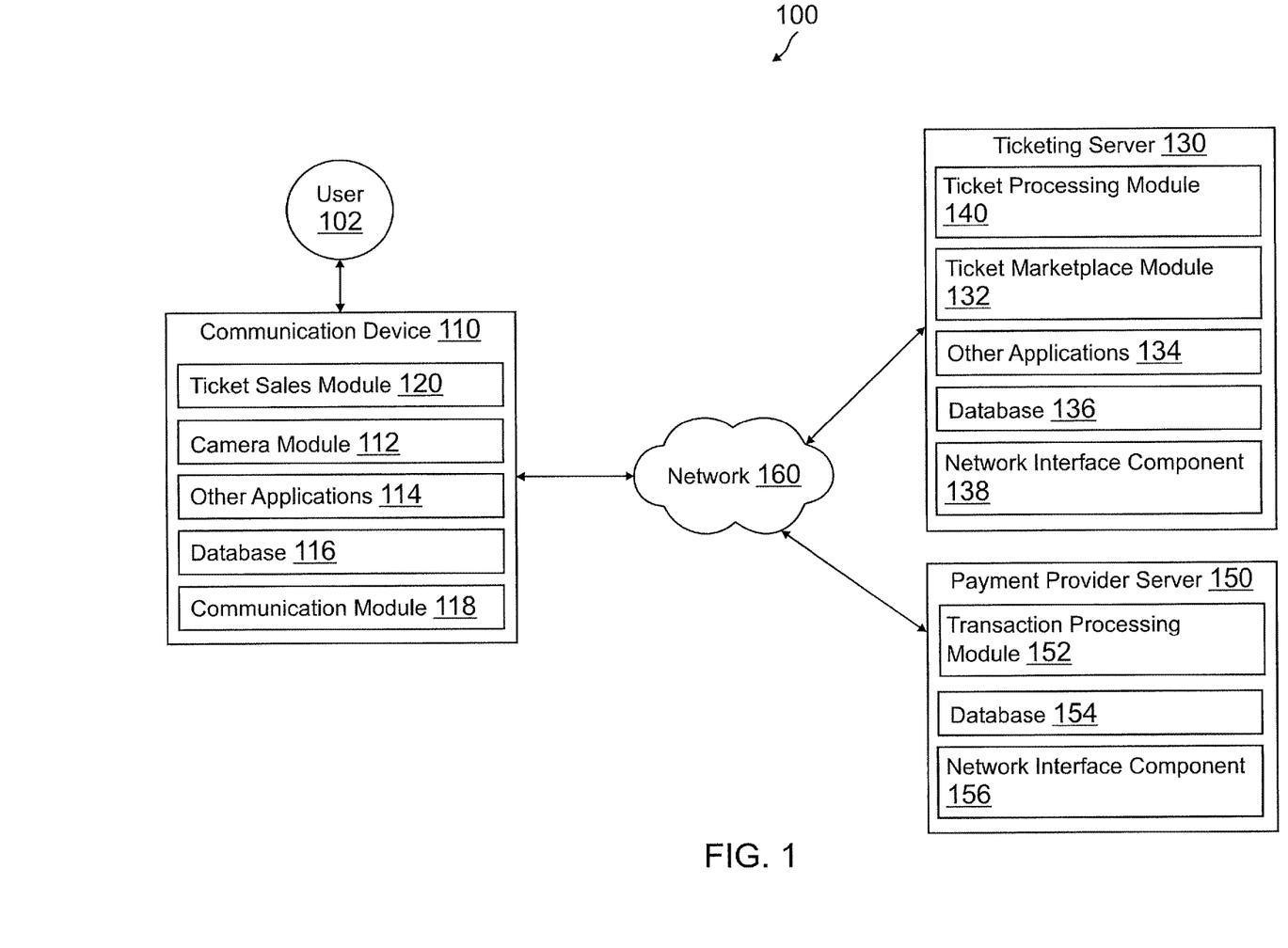
FIG. 1 is a block diagram of a networked system suitable for implementing the processes described herein, according to an embodiment.

FIG. 1 is a block diagram of a networked system 100 suitable for implementing the processes described herein, according to an embodiment. As shown, system 100 may comprise or implement a plurality of devices, servers, and/or software components that operate to perform various methodologies in accordance with the described embodiments. Exemplary device and servers may include device, stand-alone, and enterprise-class servers, operating an OS such as a MICROSOFT® OS, a UNIX® OS, a LINUX® OS, or other suitable device and/or server based OS. It can be appreciated that the devices and/or servers illustrated in FIG. 1 may be deployed in other ways and that the operations performed and/or the services provided by such devices and/or servers may be combined or separated for a given embodiment and may be performed by a greater number or fewer number of devices and/or servers. One or more devices and/or servers may be operated and/or maintained by the same or different entities.

System 100 includes a user 102, a communication device 110, a ticketing server 130, and a payment provider server 150 in communication over a network 160. User 102, such as a ticket seller, may utilize communication device 110 to capture an image having a visual representation of an event admission ticket. User 102 may then upload the visual representation to ticketing server 130 over network 160. Ticketing server 130 may then determine ticket information and ticket validity using optical character recognition (OCR) as well as a template corresponding to the event admission ticket having polygon coordinates and/or polygon location information of the ticket information on the template. Ticketing server 130 may determine ticket validity using the ticket information with the ticket template, venue ticketing information, and/or ticket sales information. Ticketing server 130 may then process the ticket information and the ticket validity to determine a sale offer for the event admission ticket. A sale of the ticket may then be completed with a buyer using payment provider server 150.

Communication device 110, ticketing server 130, and payment provider server 150 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 100, and/or accessible over network 160.

Communication device 110 may be implemented using any appropriate hardware and software configured for wired and/or wireless communication with ticketing server 130 and payment provider server 150. For example, in one embodiment, communication device 110 may be implemented as a personal computer (PC), a smart phone, laptop computer, wristwatch with appropriate computer hardware resources, eyeglasses with appropriate computer hardware (e.g. GOOGLE GLASS®) and/or other types of computing devices capable of transmitting and/or receiving data, such as an IPAD® from APPLE®. Although a communication device is shown, the communication device may be managed or controlled by any suitable processing device. Although only one communication device is shown, a plurality of communication devices may be utilized.

Communication device 110 of FIG. 1 contains a ticket sales module 120, a camera module 112, other applications 114, a database 116, and a communication module 118. Camera module 112, ticket sales module 120, and other applications 114 may correspond to processes, procedures, and/or applications, for example, a software program, executable by a hardware processor. In other embodiments, communication device 110 may include additional or different modules having specialized hardware and/or software as required.

Camera module 112 may correspond to one or more processes to execute modules and associated specialized hardware of communication device 110 to provide an application to capture images using a device camera of communication device 110, such as camera module 112. In this regard, camera module 120 may correspond to specialized hardware and/or software that may include an optical recording device of communication device 110 enabling user 102 to capture/record images, including still and/or video images. Camera module 112 may correspond to a digital camera of communication device 110, or may more generally correspond to any device capable of recording an image. Camera module 112 may include various features, such as zoom, flash, focus correction, shutter speed controls, or other various features usable to capture one or more images of user 102 and/or other users. Camera module 112 may further display a preview and/or captured image to user 102 through another device of communication device 110, such as a viewfinder, screen (e.g., mobile phone screen), or other display.

User 102 may utilize the digital camera or other optical receiving device to record a still image and/or video image containing a visual representation of an event admission ticket. Thus, camera module 112 may capture one or more visual representations of an event admission ticket for use with ticket sales module 120 and/or ticketing server 130. For example, the captured image may contain a portrait of the event admission ticket. In various embodiments, more than one captured image may be utilized to obtain images of multiple perspectives of the event admission ticket. The multiple images may correspond to orientation of the event admission ticket, such as top, bottom, back, etc. The images may also correspond to multiple event admission tickets, for example a board having a plurality of event admission tickets, or may correspond to a video of one or more event admission tickets.

Additionally, camera module 112 provide additionally processing after capturing an image, including cropping, adjusting color/saturation/resolution, or other editing procedures. Camera module 112 may utilize functions associated with the optical receiving device, such as flash, zoom, image resolution, or other camera parameter. Additionally, camera module 112 may provide for creating, accessing, and editing a library of images, such as a photo book of captured images stored in database 116. The library and/or individual images may be accessible by one or more other applications, including ticket sales module 120 and/or ticketing server 130, through an API of camera module 112.

Ticket sales module 120 may correspond to one or more processes to execute modules and associated specialized hardware of communication device 110 to provide a convenient interface to permit user 102 to upload visual representations of event admission tickets, enter information corresponding to the event admission ticket, select payment options for the event admission ticket, and provide delivery options for the event admission ticket. In this regard, ticket sales module 120 may correspond to specialized hardware and/or software having a user interface enabling the user to select visual representations of event admission tickets stored by communication device 110, capture an image of the event admission ticket, and/or complete a sale offer for the event admission ticket. In some embodiments, ticket sales module 120 may correspond more generally to a web browser configured to view information available over the Internet or access a website corresponding to a ticket sales application.

Ticket sales module 120 may retrieve a stored image of a visual representation of an event admission ticket from database 116. In other embodiments, ticket sales module 120 may capture the image using camera module 112. Once the visual representation of the event admission ticket is loaded to ticket sale application 112, ticket sales module 120 may transmit the visual representation to ticketing server 130 for processing. In various embodiments, optical character recognition (OCR) and other processing of image data may be done by ticketing server 130. However, ticket sales module 120 may also perform OCR and processing of image data of the image having the visual representation of the event admission ticket. Thus, communication device 110 may include processes and/or features to perform OCR and other image processing of an image. Ticketing server 130 may request additional information corresponding to the event admission ticket, such as ticket information, ticket validity, and/or additional ticket verification, which user 102 may transmit to ticketing server 130 using ticket sales module 120. Ticket sales module 120 may also be utilized to review a sale offer for the event admission ticket generated by ticketing server 130, as will be explained in more detail herein, and edit, approve, or decline the sale offer. Ticket sales module 120 may be utilized to transmit additional information to ticketing server 130, including ticket price, ticket delivery terms, etc. User 102 may also provide seller information for user 102 for use in the ticket sales listing/posting (e.g., payment terms, delivery teens, a name or other personal information for user 102, etc.). Ticket sales module 120 may also be utilized to receive payment for a purchased event admission ticket and/or provide payment for an event admission ticket. Ticket sales module 120 may utilize payment provider server 150 to process payment services.

In various embodiments, one or more features of camera module 112 and ticket sales module 120 may be incorporated in the same module so as to provide their respective features in one module.

Communication device 110 includes other applications 114 as may be desired in particular embodiments to provide features to communication device 110. For example, other applications 114 may include security applications for implementing client-side security features, programmatic client applications for interfacing with appropriate application programming interfaces (APIs) over network 160, or other types of applications. Other applications 114 may also include email, texting, voice and IM applications that allow a user to send and receive emails, calls, texts, and other notifications through network 160. In various embodiments, other applications 114 may include financial applications, such as banking, online payments, money transfer, or other applications associated with payment provider server 150. Where such features are not provided by camera module 112 and/or ticket sales module 120, other applications may include browser applications, payment applications, and/or image/video archiving application. Other applications 114 may contain software programs, executable by a processor, including a graphical user interface (GUI) configured to provide an interface to the user.

Communication device 110 may further include database 116 which may include, for example, identifiers such as operating system registry entries, cookies associated with ticket sales module 120, camera module 112, and/or other applications 114, identifiers associated with hardware of communication device 110, or other appropriate identifiers, such as identifiers used for payment/user/device authentication or identification. Database 116 may include images captured by camera module 112, including images having visual representations of an event admission ticket. Database 116 may be accessed by camera module 112, ticket sales module 120, and/or ticketing server 130 to store, transmit, and/or receive images. In one embodiment, identifiers in database 116 may be used by a payment/credit provider, such as payment provider server 150, to associate communication device 110 with a particular account maintained by the payment/credit provider. Database 116 may further include payment card information, including credit, debit, and/or gift card information. In various embodiments, database 116 may include online account access information. Database 116 may further store receiving information for ticket sales listings/postings, where such information may be received from ticketing server 130.

Communication device 110 includes at least one communication module 118 adapted to communicate with ticketing server 130 and payment provider server 150 over network 160. In various embodiments, communication module 118 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Ticketing server 130 may be maintained, for example, by an online ticket sales and delivery provider, which may provide event admission ticketing services and/or processing for event admission tickets sold by private sellers, venues, and multi-venue sellers. In this regard, ticketing server 130 includes one or more processing applications which may be configured to interact with communication device 110 and/or payment provider server 150 to facilitate creation of sale offers for event admissions tickets and payment for the event admission tickets. In one example, ticketing server may be provided by STUBHUB®, Inc. of San Francisco, Calif., USA. However, in other embodiments, ticketing server may be maintained by or include a credit provider, payment provider, and/or other service provider, which may provide ticketing services to user 102.

Ticketing server 130 of FIG. 1 includes a ticket processing module 140, a ticket marketplace module 132, other applications 134, a database 136, and a network interface component 138. Ticket processing module 140, ticket marketplace module 132, and other applications 134 may correspond to processes, procedures, and/or applications, for example, a software program, executable by a hardware processor. In other embodiments, ticketing server 130 may include additional or different modules having specialized hardware and/or software as required.

Ticket processing module 140 may correspond to one or more processes to execute modules and associated specialized hardware of ticketing server 130 to process visual representations of event admission tickets, create sale offers for the event admission tickets, and complete a transaction for the event admission tickets. In this regard, ticket processing module 140 may correspond to specialized hardware and/or software that may process an uploaded visual representation of an event admission ticket. For example, ticket processing module 140 may receive and/or access a visual representation of an event admission ticket. Ticket processing module 140 may access an API of camera module 112 and/or ticket sale application 112 to retrieve the visual representation. In other embodiments, ticket processing module 140 may receive the visual representation from communication device 110 and/or another image storage device, such as an online image storage server. Ticket processing module 140 may then verify the uploaded image file includes a visual representation of an event admission ticket or may convert the uploaded file to a readable format. If the file including the visual representation cannot be processed, ticket processing module 140 may display an error to user 102 and request a new file with another visual representation of the event admission ticket.

After receiving the visual representation, ticket processing module 140 may determine ticket information and ticket validity from the visual representation. The ticket information may include admission, seating, price, bar/QR code, event time, event date, event name, venue name, venue location, and/or other information included in an event admission ticket. In order to determine the ticket information and the ticket validity, ticket processing module 140 may use optical character recognition (OCR) with polygon coordinates and/or polygon location information of the ticket information and/or ticket validity on the visual representation of the event admission ticket. Ticket processing module 140 may utilize a template of one or more event admission tickets that includes data for the polygon coordinates of the ticket information on the event admission ticket. Thus, by comparing a template of an event admission ticket to the visual representation uploaded to ticket processing module 140, ticket processing module 140 may determine where the placement of ticket information should be on the visual representation of the event admission ticket (e.g., the polygon coordinates of the ticket information) and utilize OCR to extract the ticket information. In certain embodiments, the polygon coordinates may also correspond to ticket validity information, such as a bar code, a QR code, an authenticity/validity number, or other information that proves the ticket is valid, has not been redeemed, or is not copied (or may be used to identify multiple tickets using the same validity information copy).

The ticket validity may also be determined using the ticket information. For example, ticket processing module 140 may access a database, including database 136 and/or a database of a venue, comprising venue ticketing information, such as a list of available tickets in the venue, a ticket seating map, and a list of sold tickets. In certain embodiments, database 136 may include information of other sale offers for the same or similar event admission ticket to the uploaded visual representation. If the ticket information corresponds to a non-existent seat, row, section, etc., or if the ticket has previously been sold, redeemed, or is on sale, ticket processing module 140 may determine the uploaded visual representation of the event admission ticket is invalid. However, if the ticket information corresponds to an available seat, ticket, unsold ticket, non-duplicate sales, or ticket that has been sold but ticket processing module 140 determines the event admission ticket is valid for resale, ticket processing module 140 may determine the uploaded visual representation of the event admission ticket is valid. If doubt to the authenticity of the ticket is questioned, review of the visual representation and/or event ticket admission may be requested, for example, from the seller of the event admission ticket and/or a ticket sales administrator. Thus, additional ticket verification may be requested from user 102.

If an uploaded visual representation of an event ticket admission does not have a ticket template from which to determine the polygon coordinates of the ticket information and/or ticket validity, ticket processing module 140 may be utilized to create a ticket template from the visual representation and submitted ticket information from user 102 and/or an administrator of ticketing server 130. For example, if a ticket template for the event ticket admission is not found, user 102 may be required to submit ticket information and proof of ticket validity. User 102 and/or an administrator of ticketing server 130 may verify the authenticity of the ticket information and ticket validity. Using OCR, ticket processing module 140 may determine where the submitted ticket information and/or ticket validity is on the uploaded visual representation of the event ticket admission. Thus, ticket processing module 140 may construct a template using this information.

Once the ticket information and the ticket validity are extracted from the visual representation, ticket processing module 140 may determine a sale offer for the event admission ticket. The sale offer may include the ticket information, proof of validity of the ticket, delivery terms of the ticket and a price (predetermined or entered by user 102). Ticket marketplace module 132 may then be utilized to sell the event admission ticket by posting the sale offer.

Ticket marketplace module 132 may correspond to one or more processes to execute modules and associated specialized hardware of ticketing server 130 to provide an online marketplace enabling user, including user 102, to post sale offers for event admission tickets, view the sale offers, and complete transactions to pay for the event admission tickets in the sale offers and receive the event admission ticket(s). In this regard, ticket marketplace module 140 may correspond to specialized hardware and/or software to provide a marketplace interface displayable on communication device 110. In various embodiments, ticket marketplace module 132 may correspond to a marketplace where a plurality of users and/or venues may sell event admission tickets. Thus, ticket marketplace module 132 may offer services similar to STUBHUB®, Inc. of San Jose, Calif., USA, and/or EBAY®, Inc. of San Jose, Calif., USA. However, marketplace application 122 may correspond more generally to any application enabling ticketing server 130 to offer event admission tickets for sale to users. Event admission tickets available from ticket marketplace module 132 may correspond to a venue, event, location, etc.

Ticket marketplace module 132 may include event admission tickets for sale, purchase prices of the event admission tickets, inventory of the event admission tickets, and/or terms of purchase. Ticket marketplace module 132 may further track information about sales and prices of event admission tickets. For example, ticket marketplace module 132 may adjust and/or track sale prices and inventory levels as purchases are made. In addition to being accessible directly by communication device 110, ticket marketplace module 132 may be utilized by payment provider server 150 (through accessing an API of ticket marketplace module 132), to complete payment for an event admission ticket, transmission of payment, and/or delivery of the event admission tickets to user 102. For example, ticket marketplace module 132 may also be configured to interact with payment provider server 150 to complete purchase requests corresponding to sale offers for event admission tickets available with ticket marketplace module 132.

In various embodiments, ticketing server 130 includes other applications 134 as may be desired in particular embodiments to provide features to ticketing server 130. For example, other applications 134 may include security applications for implementing server-side security features, programmatic server applications for interfacing with appropriate application programming interfaces (APIs) over network 160, or other types of applications. Other applications 134 may contain software programs, executable by a processor, including a graphical user interface (GUI), configured to provide an interface to a user.

Additionally, payment provider server 140 may include database 136. User 102 may establish one or more user accounts with ticketing server 130 in order to sell and/or purchase event admission tickets. Database 136 may include user accounts having user information, such as name, address, birthdate, payment/funding information, additional user financial information, and/or other desired user data. User 102 may link to a user account in database 136 through a user identifier and/or communication device identifier. However, in other embodiments, user 102 may not have previously established a user account. Thus, ticketing server 130 may list ticket sales listings/postings and complete a transaction based on another user identifier/account received from communication device 110 and/or payment provider server 150. Additionally, database 136 may include uploaded visual representations of event admission tickets for use in sale offers and/or determining sale offers, as previously discussed. Database 136 may also include ticket templates for use in determining ticket information and ticket validity.

In various embodiments, ticketing server 130 includes at least one network interface component (NIC) 138 adapted to communicate with network 160 including communication device 110 and/or payment provider server 150. In various embodiments, network interface component 138 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RE), and infrared (IR) communication devices.

Payment provider server 150 may be maintained, for example, by an online payment service provider, which may provide payment services and/or processing for financial transactions on behalf of a user with a merchant. In this regard, payment provider server 150 includes one or more processing applications which may be configured to interact with communication device 110 and/or ticketing server 130 to facilitate payment for a transaction (e.g., a sale offer for an event admission ticket). In one example, payment provider server 150 may be provided by PAYPAL®, Inc. of San Jose, Calif., USA. However, in other embodiments, payment provider server 150 may be maintained by or include a credit provider, financial services provider, financial data provider, and/or other service provider, which may provide payment services to user 102.

Payment provider server 150 of FIG. 1 includes a transaction processing module 152, database 154, and a network interface component 156. Transaction processing module 152 may correspond to processes, procedures, and/or applications executable by a hardware processor, for example, a software program. In other embodiments, payment provider server 150 may include additional or different software as required.

Transaction processing module 152 may correspond to one or more processes to execute modules and associated specialized hardware of payment provider server 150 to receive and/or transmit information from communication device 110 and/or ticketing server 130 for processing and completion of financial transactions for event admission tickets. In this regard, transaction processing module 152 may correspond to specialized hardware and/or software to process financial transaction information from communication device 110 and ticketing server 130 by receiving a payment token from ticketing server 130 for payment of sale offer for an event admission ticket. The payment token may correspond to a payment request from a user (including, in various embodiments, user 102) to ticketing server 130. The payment token may be encrypted prior to transmission to transaction processing application 132. The payment token may include information corresponding to user identifiers, user financial information/identifiers, transaction information and/or identifiers, and/or ticketing server 130 identifiers. Additionally, the payment token may include a payment request having payment amount and terms of payment for the sale offer. Once received, transaction processing module 152 may utilize a payment account or financial information of the paying user to render payment for the sale offer. Payment may be made to ticketing server 130 and/or a payment/financial account corresponding to the selling user. Additionally, transaction processing module 152 may provide transaction histories, including receipts, to communication device 110 and/or ticketing server 130 for completion and documentation of the financial transaction for the sale offer.

Additionally, payment provider server 140 includes database 152. As previously discussed, user 102 may establish one or more user accounts with payment provider server 150. Database 152 may include user accounts having user information, such as name, address, birthdate, payment/funding information, additional user financial information, and/or other desired user data. User 102 may link a user account in database 152 to communication device 110 through a user identifier, communication device identifier, and/or user account identifier. Thus, when an appropriate identifier is transmitted to payment provider server 140, e.g. from communication device 110 and/or ticketing server 130, a user account belonging to user 102 may be found. However, in other embodiments, user 102 may not have previously established a user account. Thus, payment provider server 150 may complete a transaction based on other user financial information received from communication device 110 and/or ticketing server 130.

In various embodiments, payment provider server 150 includes at least one network interface component (NIC) 156 adapted to communicate with network 160 including communication device 110 and/or ticketing server 130. In various embodiments, network interface component 156 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 160 may be implemented as a single network or a combination of multiple networks. For example, in various embodiments, network 160 may include the Internet or one or more intranets, landline networks, wireless networks, and/or other appropriate types of networks. Thus, network 160 may correspond to small scale communication networks, such as a private or local area network, or a larger scale network, such as a wide area network or the Internet, accessible by the various components of system 100.

Figure 2:
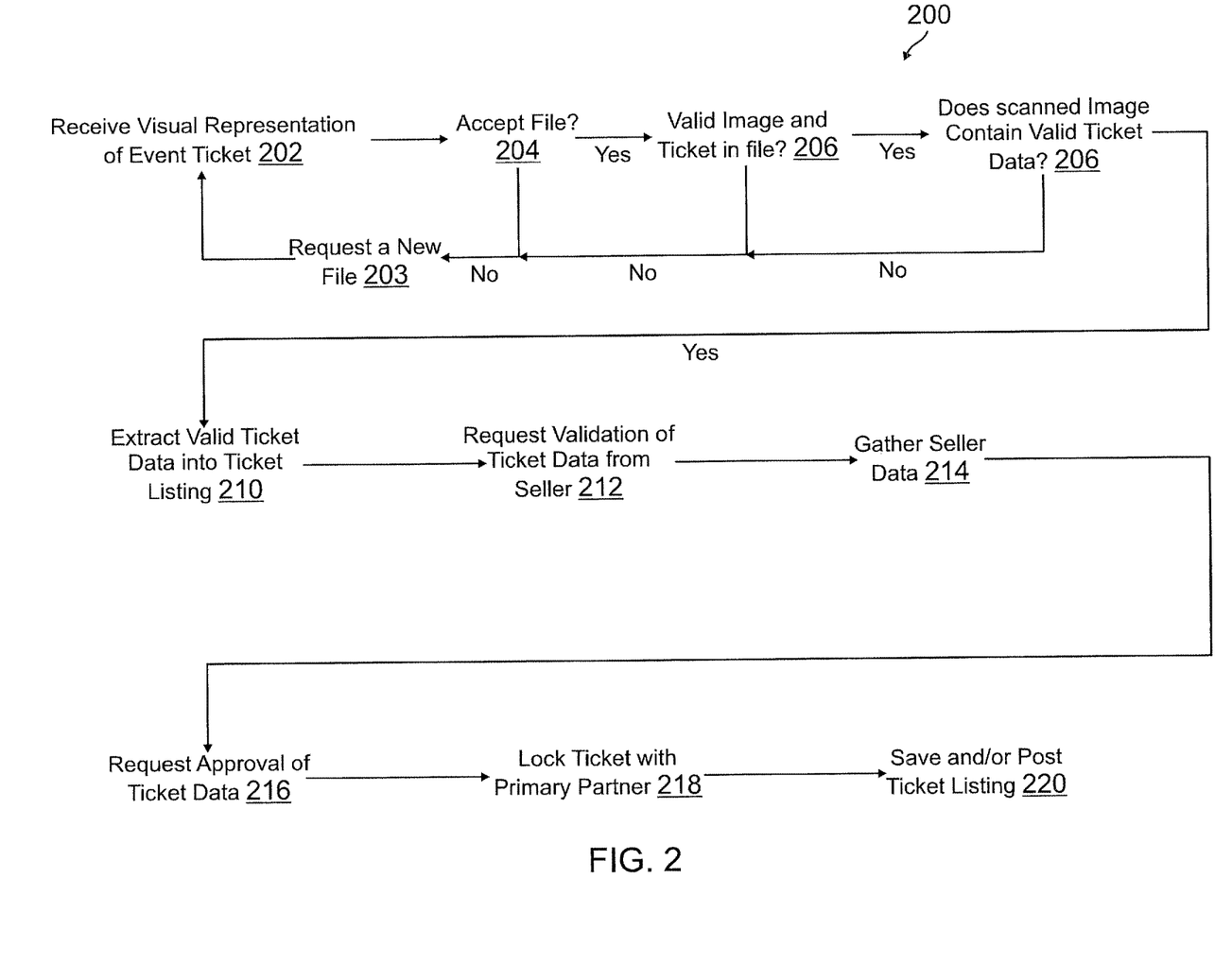
FIG. 2 is an exemplary flowchart of a process by which a server may determine validity of an event ticket and automatically populate admission information for use in a ticket sale offer, according to an embodiment.

FIG. 2 is an exemplary flowchart of a process by which a server may determine validity of an event ticket and automatically populate admission information for use in a ticket sale offer, according to an embodiment.

In environment 200, a ticket processing module may execute the shown steps in order to process a visual representation of an event admission ticket to determine the ticket's validity and extract ticket information. Thus, at step 202, a visual representation of an event ticket is received. The visual representation may be included within a file, such as an image or other data file (e.g., a file having a .jpg, .gif, .pdf, or other file extension signifier). At step 204, the ticket processing module may decide whether to accept the file. The file may not be accepted if it is corrupt or a type of file not normally used to communicate visual representations to the module. If the file is not accepted, the module may request a new file at step 203 and return to step 202 when the new file is received.

However, where the file is received, the ticket processing module may determine if there is a valid image and ticket in the file, at step 206. The ticket processing module may determine whether the image includes a valid visual representation, such as a decipherable image. If the contrast, resolution, brightness, or other image parameter is inadequate to read the image, the module may return to step 203. However, if the module may process a valid image, the module may further determine whether the image in the visual representation corresponds to a ticket. The module may utilize known ticket parameters in a database accessible by the module, such as size, ratio, bar/QR code analysis, etc., to determine if the image is of a ticket. Additionally, edge detection may be utilized. In various embodiments, a template of a ticket may be utilized to determine whether edges and polygon coordinates of data in the visual representation correspond to a ticket.

Thus, where the image is decipherable by the ticket processing module and a ticket is viewable in the visual representation, the module may determine if the scanned image contains valid ticket data, at step 208. In determining whether the image contains valid ticket data, the module may determine the data included in the ticket, such as the ticket information (e.g., seating information, event information, admission information, venue information, and/or ticket code information included on the ticket in the visual representation). The module may utilize optical character recognition to determine whether the ticket includes valid ticket data. Additionally, templates having polygon coordinates of where ticket data is located on the same or similar tickets may be utilized to determine the ticket data, and whether the ticket data is found in valid locations of the ticket. To determine the proper template to use for comparison with the image, the image of the ticket may first be analyzed to determine a ticket issuer (e.g., the venue, a ticketing service, such as TICKETMASTER, an artist or performer, or other ticket issuing entity or person). A database may then be searched for one or more valid/confirmed tickets (templates) from the same ticket issuer as the one identified from the image of the ticket. When comparing the location of fields of the imaged ticket with the template, the position of the camera when capturing the image of the ticket may be taken into account. For example, if the camera was directly in front of the ticket, no variations may be present. However, if the camera was at an angle, the location of one or more fields of the ticket may not exactly coincide with the template, even though the ticket is authentic. In those cases, the effect can be accounted for and compensated for (if desired). Line thickness, line variations, and/or line, character, and/or symbol colors may also be compared to determine ticket authenticity.

Once the ticket data is determined, a venue and/or event service provider (e.g., a server or service provider for the event and/or venue) may be accessed by the module, and available information about the event and/or venue may be utilized to determine if the ticket data is valid. For example, a venue may not have a row/seat number on a forged ticket, or the event time and/or location may be incorrect on such a ticket. Other forged tickets may correspond to tickets with incorrect bar/QR/alphanumeric codes and/or tickets that have already be sold or used. If the ticket does not contain valid data, a new file may be requested and/or fraud services may be alerted.

The aforementioned templates may be entered by a system administrator servicing the ticket processing module. Additionally, the ticket processing module may determine further event admission tickets when valid ticket data is extracted into a ticket listing, at step 210. For example, if the ticket contains valid data, a new template may be formulated having the polygon coordinates of the data extracted from the ticket in the visual representation. Additionally, if the module does not recognize the ticket and thus no valid ticket data is extracted, but instead requested from the user, a template may be formulated with polygon coordinates of ticket data when the user provides the ticket data in a ticket listing using optical character recognition with the visual representation.

At step 212, validation of the ticket data in the ticket listing is requested from the seller. Thus, the seller may view the ticket data to determine if the ticket data is correct and whether any data may be changed. In order to complete the ticket listing, seller data may be gathered, such as from the seller (e.g., through a request from the seller's communication device) and/or through known information about the seller in a database accessible by the ticket processing module, at step 214. The module may then request approval of the ticket data, at step 216, which may approve the final ticket listing having the seller data. At step 218, if the primary partner offering the ticket for sale and use (e.g., the event/venue service provider) is accessible, the ticket may be locked with the primary partner from use and/or sale again, at step 218. The ticket processing module may then save and/or have posted the ticket listing, for example, using a ticket marketplace module, at step 220.

Figure 3:
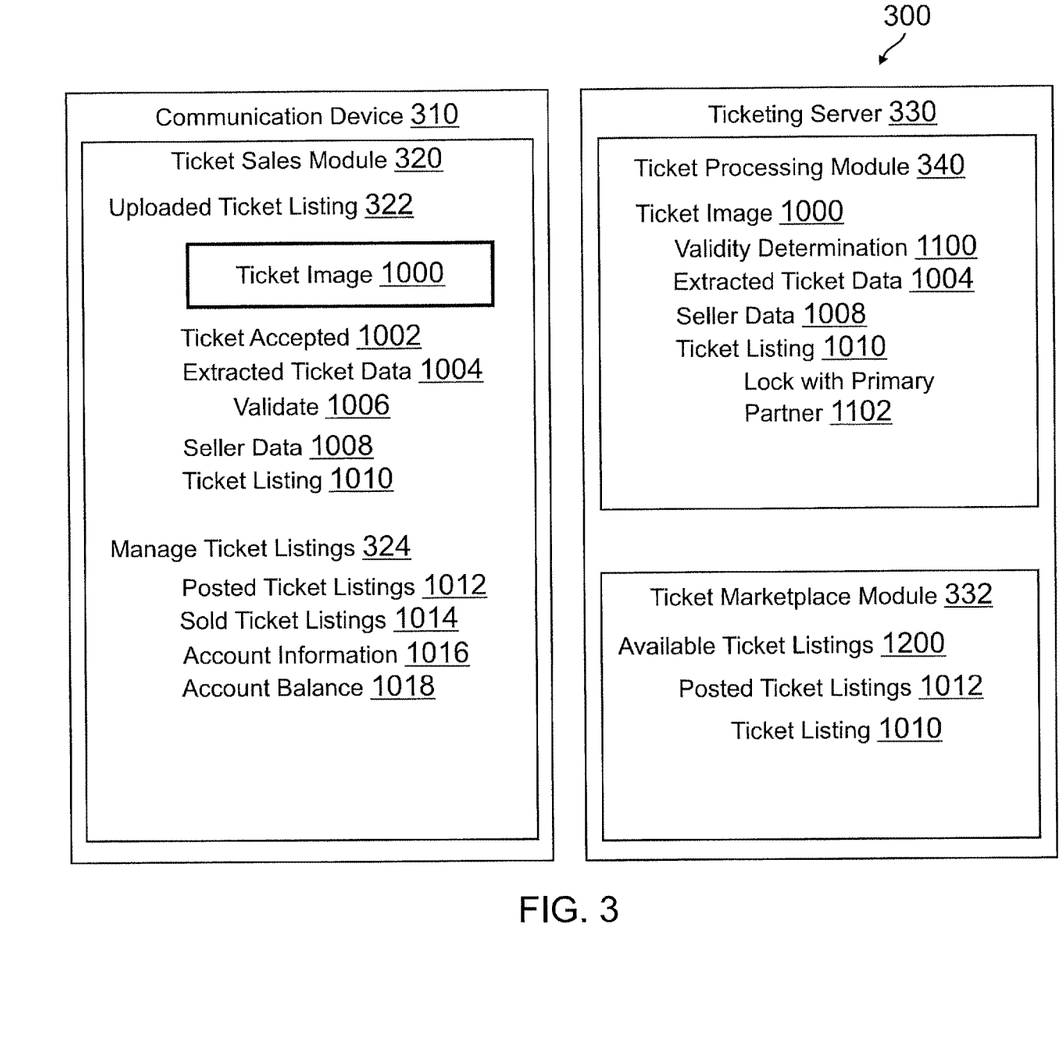
FIG. 3 is an exemplary system environment having a communication device providing ticket information through a visual representation for use in event ticket validity and automatic population of admission information, according to an embodiment.

FIG. 3 is an exemplary system environment having a communication device providing ticket information through a visual representation for use in event ticket validity and automatic population of admission information, according to an embodiment. Environment 300 of FIG. 3 includes a communication device 310 and a ticketing server 330 corresponding generally to communication device 110 and ticketing server 130, respectively, of FIG. 1.

Communication device 310 executes a ticket sales module 320 corresponding generally to the specialized hardware and/or software modules and processes described in reference to ticket sales module 120 of FIG. 1. In this regard, ticket sales module 320 includes an uploaded ticket listing 322 and a manage ticket listings 324. Uploaded ticket listing 322 corresponds to information provided ticketing server 330 for use in creating a ticket sales listing for an event admission ticket. Thus, uploaded ticket listing 322 includes ticket image 1000, which may include a file having a visual representation of an event admission ticket. Ticket image 1000 may be communicated to ticketing server 330 for processing. Where ticketing server 330 accepts ticket image 1000, the user of communication device 310 (e.g., a seller of the event admission ticket, not shown) may see a ticket accepted 1002 notification. Further, after processing ticket image 1000, the user may view extracted ticket data 1004, which may include the ticket seating, event, venue, admission, code, and/or other information. The user may be given the option to validate 1006, which may validate that extracted ticket data 1004 include the correct ticket information. Additionally, the user may provide seller data 1008 for use in creating ticket listing 1010.

The user may further be given options and processes to manage ticket listings 324. Manage ticket listings 324 may correspond to an online marketplace and/or user account where the user may view and manage ticket sales listings/postings the user has place on an online marketplace, such as one offered by ticket marketplace module 332. Thus, manage ticket listings 324 includes posted ticket listing 1012 having ticket sales listings on the marketplace and available for purchase from another user. The user of communication device 310 may also view sold ticket listings 1014 in order to view previous sold tickets, account information 1016, and an account balance 1018.

Ticketing server 330 executes a ticket processing module 340 corresponding generally to the specialized hardware and/or software modules and processes described in reference to ticket processing module 140 of FIG. 1. In this regard, ticket processing module 340 includes a ticket image 1000 for processing, corresponding to ticket image 1000 in ticket sales module 320. Ticket image 1000 may be processed, as described herein, in order to determine a validity determination 1100. Validity determination 1100 may be determined using one or more of optical character recognition, polygon coordinates of ticket information/data in a ticket template, and/or event/venue information available from event/venue service providers. Once ticket image 1000 is processed, extracted ticket data 1004 may be determined and communicated to communication device 310. Ticket processing module 340 may request seller data 1008 from the user of communication device 310 and generate ticket listing 1010. Additionally, ticket processing module 340 may lock the ticket/ticket information for the ticket in ticket listing 101 by executing lock with primary partner 1102.

Ticketing server 330 executes a ticket marketplace module 322 corresponding generally to the specialized hardware and/or software modules and processes described in reference to ticket marketplace module 322 of FIG. 1. In this regard, ticket marketplace module 322 may offer marketplace services to the user of communication device 310 for use in selling one or more tickets, such as an event admission ticket visually represented in ticket image 1000. Thus, ticket marketplace module 332 includes available ticket listings 1200. Available ticket listings 1200 may have all of the user's ticket listings under posted ticket listings 1012, which may include ticket listing 1010 for the event admission ticket visually represented in ticket image 1000.

Figure 4:
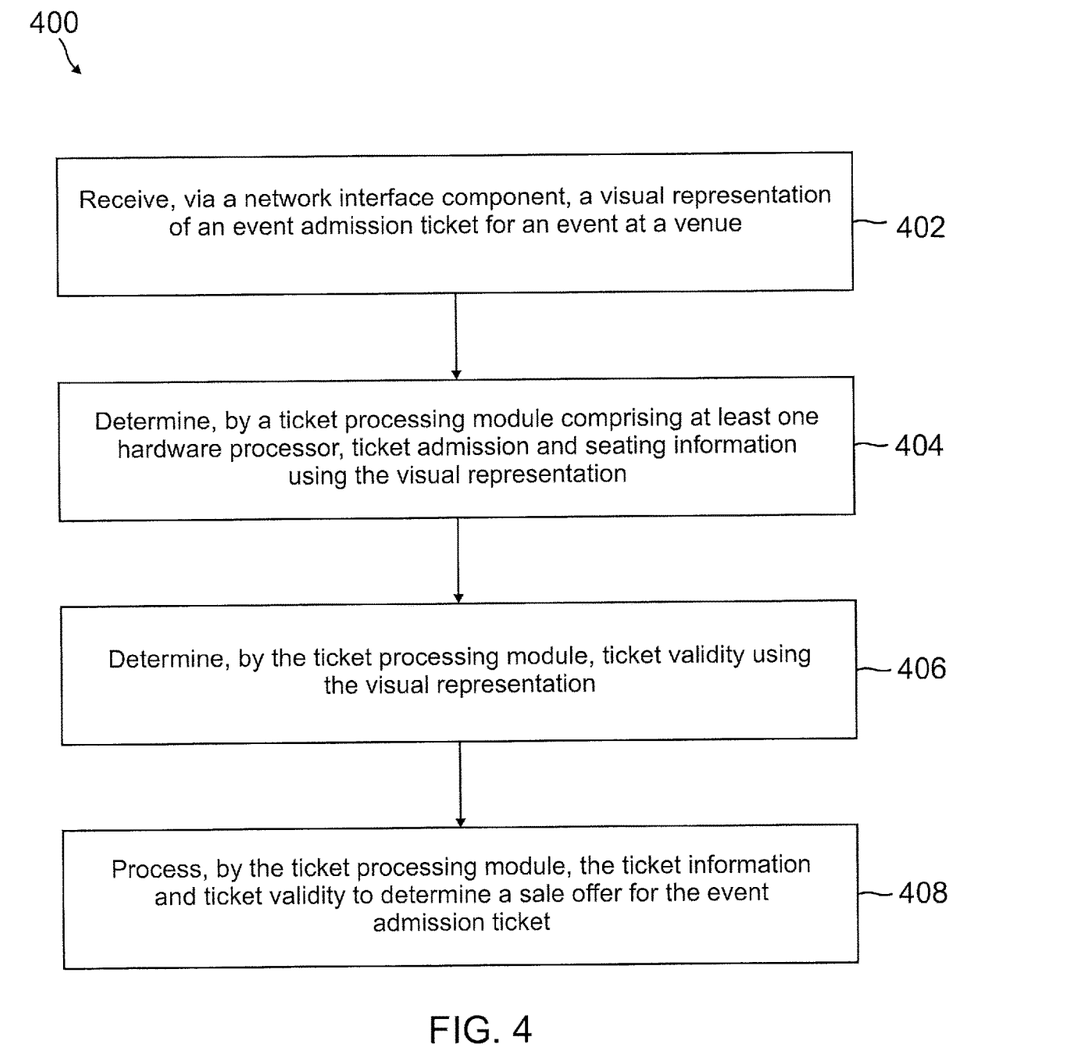
FIG. 4 is a flowchart of an exemplary process for validity determination of an event ticket and automatic population of admission information, according to an embodiment.

FIG. 4 is a flowchart of an exemplary process for validity determination of an event ticket and automatic population of admission information, according to an embodiment. Note that one or more steps, processes, and methods described herein may be omitted, performed in a different sequence, or combined as desired or appropriate.

At step 402, a visual representation of an event admission ticket for an event at a venue is received, for example, via a network interface component. The visual representation may be an image file containing a likeness of the event admission ticket. The visual representation may be uploaded to a server or may be retrieved from a communication device or other online source.

Ticket admission and seating information is determined, by a ticket processing module comprising at least one hardware processor, using the visual representation, at step 404. In various embodiments, a communication device of the user may instead determine ticket admission and seating information, such as through OCR and/or image processing. Thus, the communication device may instead provide the ticket admission and seating information to the ticket processing module. At step 406, ticket validity is determined using the visual representation and/or the ticket admission and seating information. The ticket information and/or ticket validity may be determined using at least one of optical character recognition and polygon coordinates of the ticket information and/or ticket validity. For example, a database comprising at least one first ticket template corresponding to the event admission ticket may be accessed, where the ticket information and the ticket validity is determined using the at least one first ticket template. If the at least one first ticket template does not match the visual representation ticket information and/or ticket validity may be requested from a user and at least one second ticket template determined using the received ticket information and/or ticket validity, including using OCR.

Once ticket information is determined, ticket validity may be determined using the ticket information. For example, a database comprising venue ticketing information for the venue may be accessed, where the ticket information is processed against the venue ticketing information to determine the ticket validity. The venue ticketing information may comprise at least one of available tickets, ticket seating maps, and sold tickets. A review of the event admission ticket may be requested if based on the ticket information and the venue ticketing information, for example, if the ticket information does not match the venue ticketing information or matches a previously sold ticket. The review may be requested from one of the seller of the event admission ticket and a ticket sales administrator. If the ticket validity is suspect, additional ticket verification may be requested.

At step 408, the ticket admission and seating information and ticket validity may be processed to determine a sale offer for the event admission ticket. The sale offer may be posted to an online marketplace for other users to purchase. Additionally, the sale offer may be completed using a payment provider.

Figure 5:
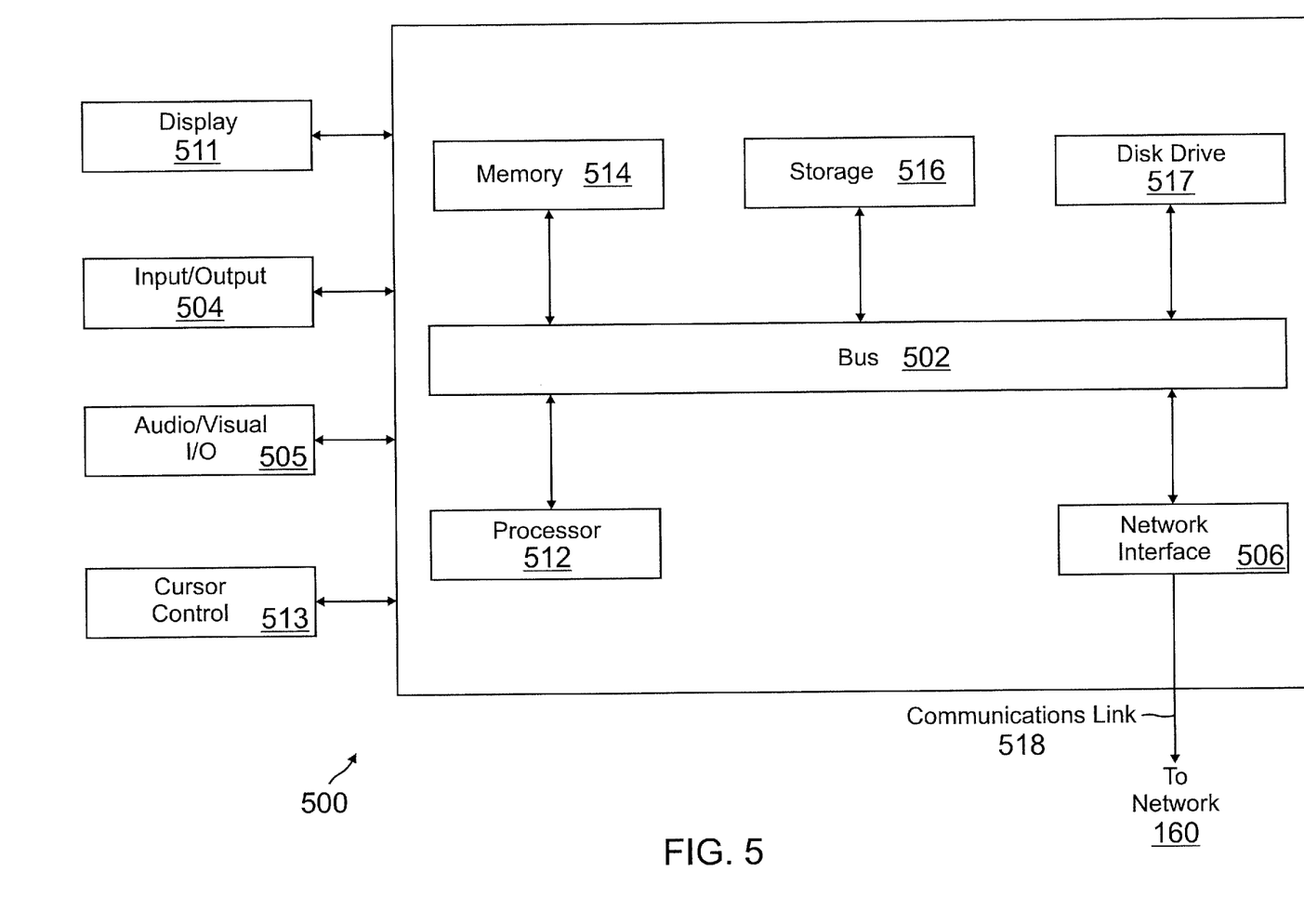
FIG. 5 is a block diagram of a computer system suitable for implementing one or more components in FIG. 1, according to an embodiment.

FIG. 5 is a block diagram of a computer system suitable for implementing one or more components in FIG. 1, according to an embodiment. In various embodiments, the communication device may comprise a personal computing device (e.g., smart phone, a computing tablet, a personal computer, laptop, a wearable computing device such as glasses or a watch, Bluetooth device, key FOB, badge, etc.)

capable of communicating with the network. The service provider may utilize a network computing device (e.g., a network server) capable of communicating with the network. It should be appreciated that each of the devices utilized by users and service providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons, image, or links, and/or moving one or more images, etc., and sends a corresponding signal to bus 502. I/O component 504 may also include an output component, such as a display 511 and a cursor control 513 (such as a keyboard, keypad, mouse, etc.). An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another communication device, service device, or a service provider server via network 160. In one embodiment, the transmission is wireless, although other transmission mediums and methods may also be suitable. One or more processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various embodiments, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A system comprising:
at least one processor of an online marketplace that:
obtains a visual representation of an event admission ticket for an event at a venue;
determines an identified issuer of the event admission ticket;
obtains a ticket admission information of the event admission ticket that is determined from the visual representation, the ticket admission information including at least one of: seat information, event information, and venue information;
determines ticket validity based on a comparison of the ticket admission information from the visual representation to expected ticket admission information for the identified issuer of the event admission ticket and a comparison of a location of at least some of the ticket admission information from the visual representation of the event admission ticket to an expected location of the expected ticket admission information for the identified issuer of the event admission ticket;
determines whether another event admission ticket having the ticket admission information has previously been sold;
in response to determining another event ticket having the ticket admission information has not previously been sold, creates a ticket listing on the online marketplace from the ticket admission information instead of requiring additional ticket verification in response to determining another event admission ticket having the ticket admission information has previously been sold; and in response to a determination that the identified issuer is accessible, requests the identified issuer to lock the ticket admission information in the ticket listing to prevent a duplicate sale on the online marketplace based on creating the ticket listing, wherein the online marketplace is a distinct entity from the identified issuer;

at least one data storage that includes the ticket admission information; and a network interface component that receives the visual representation from a communication device.

2. The system of claim 1, wherein the at least one processor determines at least one of the ticket admission information and the ticket validity, using at least one of optical character recognition (OCR) and polygon coordinates of ticket admission information in the visual representation.

3. The system of claim 2, wherein the data storage further comprises at least one template associated with the event admission ticket, wherein the template comprises valid polygon coordinates for valid ticket admission information in the event admission ticket, and wherein the at least one processor extracts the ticket admission information using the template with the visual representation.

4. The system of claim 1, wherein the at least one processor determines the ticket validity using the ticket admission information from the visual representation.

5. The system of claim 1, wherein the data storage further comprises venue ticketing information for the venue, and wherein the at least one processor accesses the venue ticketing information and determines the ticket validity from the visual representation using the venue ticketing information and the ticket admission information.

6. The system of claim 5, wherein the venue ticketing information comprises at least one of available tickets, ticket seating maps, and sold tickets.

7. The system of claim 5, wherein the at least one processor, requests a review of at least one of the event admission ticket and the visual representation based on the ticket admission information and the venue ticketing information.

8. The system of claim 7, wherein the review is requested from one of a seller of the event admission ticket and a ticket sales administrator.

9. The system of claim 1, wherein the data storage further comprises at least one first ticket template associated with the event admission ticket, and wherein the at least one processor accesses the at least one first ticket template and determines the ticket admission information from the visual representation using the at least one first ticket template with the visual representation.

10. The system of claim 9, wherein the at least one processor, requests the ticket admission information if the event admission ticket in the visual representation does not match the at least one first ticket template.

11. The system of claim 10, wherein the at least one processor determines a second ticket template using the ticket admission information and the visual representation.

12. A method comprising:

obtaining a visual representation of an event admission ticket for an event at a venue;

determining, via at least one processor of an online marketplace, an identified issuer of the event admission ticket;

obtaining, via the at least one processor, a ticket information of the event admission ticket that is determined from the visual representation, the ticket information including at least one of: seat information, event information, and venue information;

determining, via the at least one processor, ticket validity based on a comparison of the ticket information from the visual representation to expected ticket information for the identified issuer of the event admission ticket and a comparison of a location of at least some of the ticket information from the visual representation on the event admission ticket to an expected location of the expected ticket information for the identified issuer of the event admission ticket;

determining, via the at least one processor, whether another event admission ticket having the ticket information has previously been sold;

in response to determining another event ticket having the ticket information has not previously been sold, creating a ticket listing on the online marketplace from the visual representation; and in response to a determination that the identified issuer is accessible, requesting the identified issuer to lock the ticket information of the event admission ticket in the ticket listing to prevent a duplicate sale on the online marketplace based on creating the ticket listing, wherein the online marketplace is a distinct entity from the identified issuer.

13. The method of claim 12, wherein at least one of the ticket information of the event admission ticket and the ticket validity are determined using at least one of optical character recognition (OCR) and polygon coordinates of ticket admission information in the visual representation.

14. The method of claim 13, wherein the ticket information is extracted from the visual representation using a template that comprises valid polygon coordinates for valid ticket admission information.

15. The method of claim 13, further comprising accessing venue ticketing information, wherein the ticket validity is determined using the venue ticketing information.

16. The method of claim 15, wherein the venue ticketing information comprises at least one of available tickets, ticket seating maps, and previously sold tickets.

17. The method of claim 13, wherein at least one of a positioning of a camera when capturing the visual representation and variations in the visual representation caused by the camera are accounted for when determining the ticket information using the visual representation.

18. A non-transitory computer readable medium comprising a plurality of machine-executable instructions, which when executed by at least one processor of an online marketplace system, are adapted to cause the online marketplace system to perform operations comprising:

receiving ticket admission information for an event admission ticket for an event at a venue from a communication device, wherein the communication device extracts the ticket admission information of the event admission ticket from a visual representation of the event admission ticket captured by the communication device, the ticket admission information including at least one of: seat information, event information, and venue information;

determining an identified issuer of the event admission ticket;

determining ticket validity based on a comparison of the ticket admission information to expected ticket admission information for the identified issuer of the event admission ticket, and a comparison of a location of at least some of the ticket admission information from the visual representation on the event admission ticket to an expected location of the expected ticket admission information for the identified issuer of the event admission ticket;

determining whether another event admission ticket having the ticket admission information has previously been sold in response to determining another event ticket having the ticket admission information has not previously been sold, creating a ticket listing on the online marketplace system from the ticket admission information instead of requiring additional ticket verification in response to determining another event admission ticket having the ticket admission information has previously been sold; and in response to a determination that the identified issuer is accessible, requesting the identified issuer to lock the ticket admission information in the ticket listing to prevent a duplicate sale on the online marketplace system based on creating the ticket listing, wherein the online marketplace system is a distinct entity from the identified issuer.

19. The non-transitory computer readable medium of claim 18, wherein at least one of the ticket admission information and the ticket validity are determined using at least one of optical character recognition (OCR) and polygon coordinates of ticket admission information in the visual representation.

20. The non-transitory computer readable medium of claim 19, wherein the ticket admission information is extracted from the visual representation using a template that comprises valid polygon coordinates for valid ticket admission information.

\* \* \* \* \*